2

BEST AVAILABLE COPY

F. LOWRY.

GREASE LUBRICATOR.

APPLICATION FILED APR. 27, 1909.

Reissued July 11, 1911.

13,269.

2 SHEETS—SHEET 1.

Witnesses;
Wm. R. Rhoads.
Ruth A. Miller

Inventor;
Frank Lowry
By Harry Grease
Attorney.

COLUMBIA PLANOGRAPH CO., WASHINGTON, D. C.

184. LUBRICATION,
Lubricators. Force feed,
Fluid operated,
Condensation displacement,
Double passage.

F. LOWRY.
GREASE LUBRICATOR.
APPLICATION FILED APR. 27, 1909.

Reissued July 11, 1911.

13,269.

2 SHEETS—SHEET 2.

Witnesses;
Wm. R. Rhoads.
Ruth C. Miller

Inventor;
Frank Lowry
By Harry Frease.
Attorney.

COLUMBIA PLANOGRAPH CO., WASHINGTON, D. C.

184. LUBRICATION,
Lubricators, Force feed,
Fluid operated,
Condensation displacement,
Double passage.

UNITED STATES PATENT OFFICE.

FRANK LOWRY, OF STEUBENVILLE, OHIO, ASSIGNOR TO THE OHIO GREASE LUBRICANT COMPANY, A CORPORATION OF OHIO.

GREASE LUBRICATOR.

13,269. Specification of Reissued Letters Patent. Reissued July 11, 1911.
Original No. 803,296, dated October 31, 1905, Serial No. 246,233. Application for reissue filed April 27, 1909. Serial No. 492,607.

*To all whom it may concern:*

Be it known that I, FRANK LOWRY, a citizen of the United States, residing at Steubenville, in the county of Jefferson and State of Ohio, have invented certain new and useful Improvements in Grease Lubricators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new, novel, and useful improvement in that class of inventions known as "steam-actuated" lubricating-cups employing grease as a lubricant, being especially designed and intended to be connected with the steam-line supplying the steam chest and valves on an engine.

My device further has for its object the combination and arrangement of parts whereby the grease contained in the reservoir will be kept in a liquid or workable state at all times and prevented from freezing or thickening.

In the accompanying drawings in two sheets, forming a part of this specification, I have illustrated my invention by several views, in which—

Figure 1:
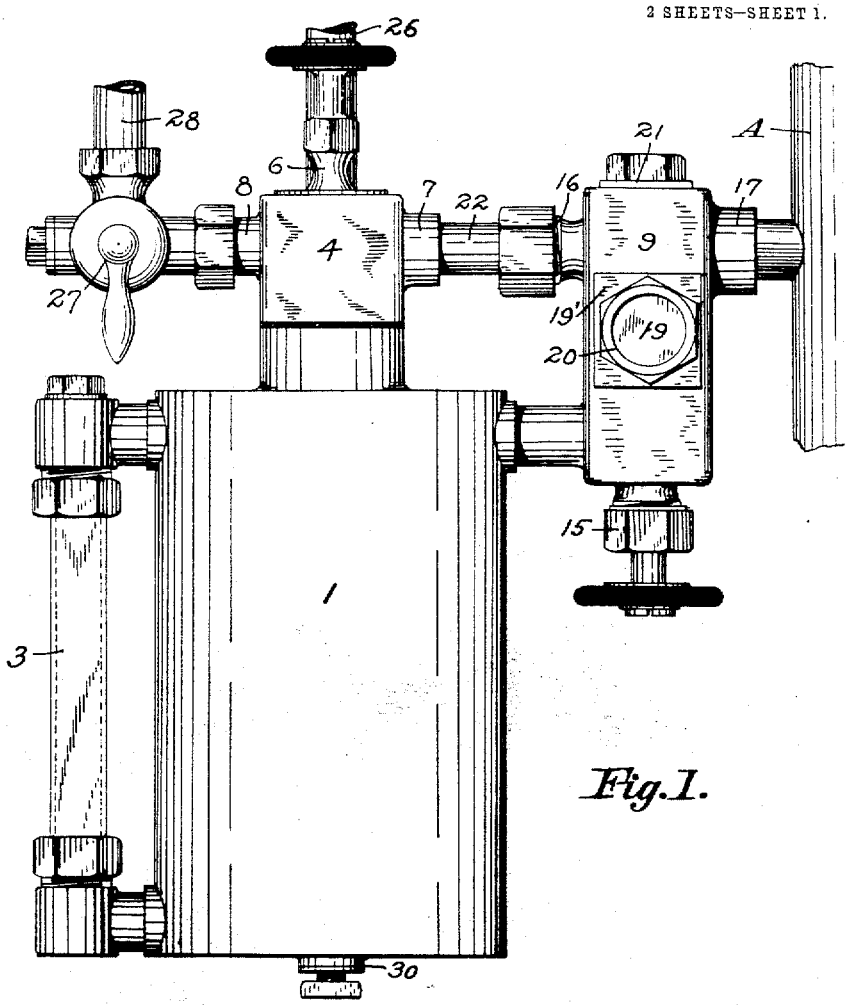
Figure 2:
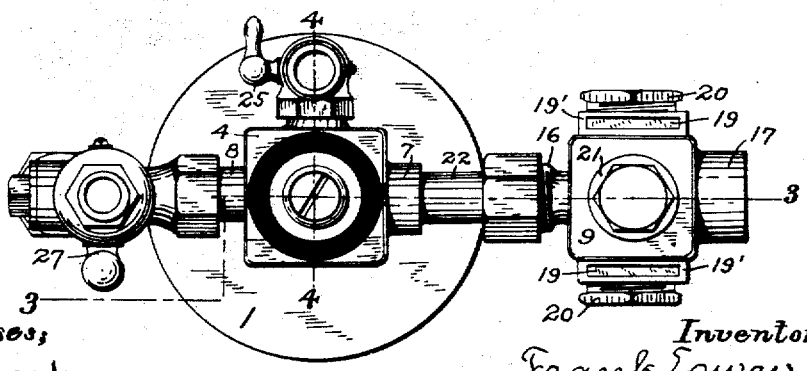
Figure 3:
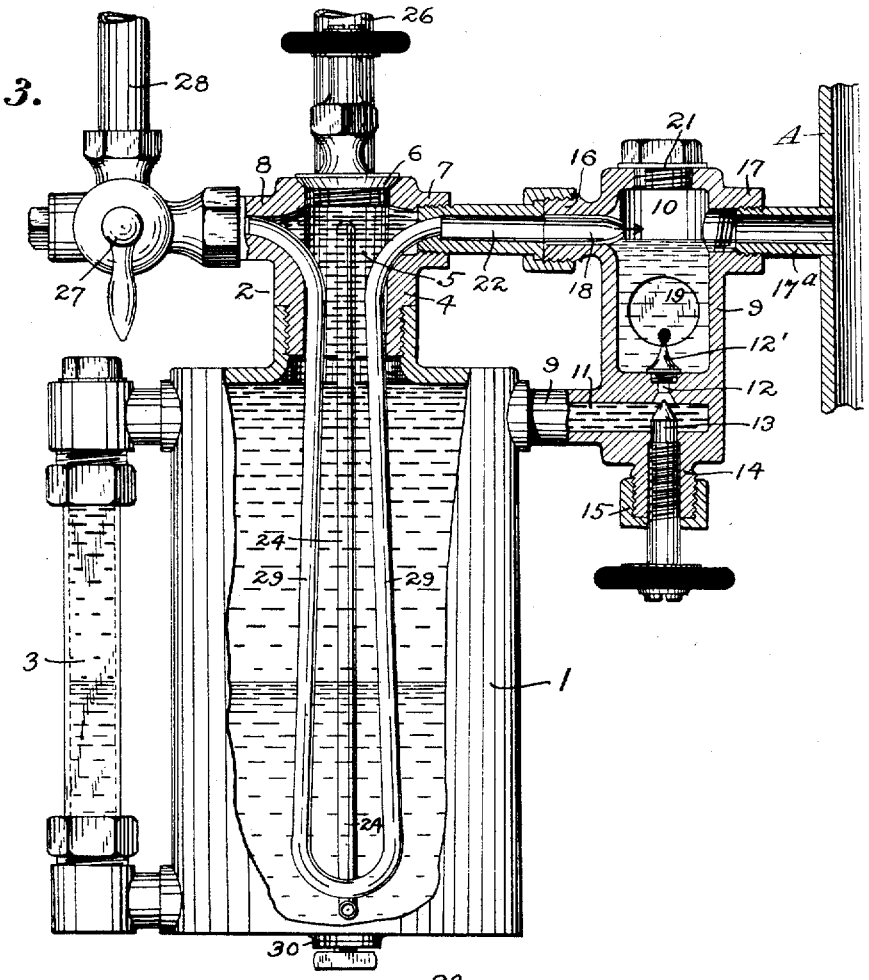
Figure 4:
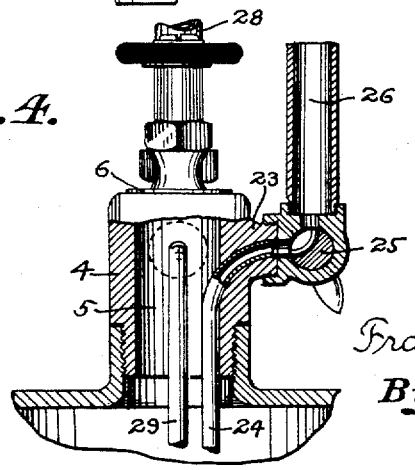

Figure 1, Sheet 1, is a front elevation of the reservoir and head portion. Fig. 2 is a top plan view of the same. Fig. 3, Sheet 2, is a front elevation showing the head and reservoir in part section, being taken on line 3—3 of Fig. 2. Fig. 4 is a side sectional view of part of the head, taken on line 4—4 of Fig. 2.

Numerals of reference designate like parts throughout the different views, in which the numeral 1 designates the reservoir portion of my device, 2 a removable head attached to the same, and 3 an index-glass arranged on the side of said reservoir.

Arranged in the central portion 4 of the head is a chamber 5, through the top of which is inserted a filling-plug 6. This chamber 5 has branch lines leading through the bosses 7 and 8, formed on both sides of the portion 4. Connected to the side of the reservoir near the top is a member 9, having a collecting or feed chamber 10 formed therein and a passage-way 11 communicating with the interior of the reservoir. Connecting said chamber 10 and the passage-way 11 is a port 12, which affords a seat for the screw-valve stem 13, entering the member 9 through a boss 14, and a packing-nut 15. Over this port 12 is seated a nipple 12′.

Formed on both sides of the member 9 near the top are the bosses 16 and 17, the latter having a central opening therethrough in which opening is connected a feed pipe 17ª leading from the chamber 10 to the supply-line. Inserted through the boss 16 is a nipple 18, the inner end extending a slight distance into the chamber 10 and directly opposite the opening in the boss 17.

Arranged on both sides of this member 9 are sight-glasses 19 19, held in suitable pockets and secured in position by jam-nuts 20, through each of which is a central opening for the purpose of observing the action of the oil through the sight-feed line thus formed. A screw-plug 21 affords a means of getting at the interior of the chamber 10 for the purpose of removing the jet or cleaning the interior of said chamber.

Connecting the bosses 7 and 16 is a coupling tube 22, one end thereof being a male connection which screws into the boss 7, while the opposite end is joined to the boss 16 by a union. Entering the chamber 5 through a boss 23, formed in the rear wall, is a condensing-tube 24, which passes on down through the head and reservoir portions nearly to the bottom of the latter. The upper end of this tube is in communication with an angle-valve 25, secured to the boss 23, and leading upward from this valve is a pipe 26, designed to be connected with the steam-line above.

Connected with the boss 8 is an angle-valve 27, from which extends a pipe 28, also leading to the steam-line above.

Internally arranged within the head and reservoir portions of my device is a radiating-tube 29, which passes down through the reservoir nearly to the bottom, one end being in communication through the boss 8 with the angle-valve 27, while the other end connects with the coupling tube 22.

A drain-valve 30 is provided in the bottom of the reservoir.

In the operation of my lubricating device the cup is placed at any suitable location near the engine, the boss 17 being connected with the steam-line supplying the steam-chest and valves on the engine, and the angle-valves 25 and 27 being connected by the pipes 26 and 28 with the steam-line at any convenient point above. The reservoir is then filled with grease through the plug 6, and the cup is ready for use. By first opening the valve 25, regulating the condensing-line, the steam from the steam-line will begin to condense in the pipe 24 and deposit in the bottom of the reservoir under the body of grease. Then by opening the valve 27 steam will pass down through the radiating-pipe 29, which can be constructed as shown in Fig. 3 or made in a coil form, and the water of condensation be deposited in the collecting-chamber 10. At the same time this radiating-pipe is reducing the grease contained in the reservoir to a liquid or workable state. By opening the valve 13 the liquid grease will appear at the nipple 12′, where it will take the form of a drop and by its own buoyancy and the hydrostatic pressure in the reservoir keeping the passage-way 11 filled, will pass upward through the body of water contained in the chamber 10 until it comes to the surface thereof in line with the discharge from the radiator pipe 29, which will force the drop of grease directly into the supply-line leading to the engine. This drop of grease is not only forced into the supply-line by the hot discharge of live steam through the nipple 18, but it is heated, expanded and atomized by being squarely impinged by the hot discharge, thus bringing it into the proper and most efficient condition for permeating the steam in the supply-line and lubricating all the parts of the engine.

It being essential that the chamber 10 be kept filled with water up to the supply-line leading to the engine, so as to insure the proper working of the cup should any vacuum be produced from various causes arising—*i. e.*, an engine running after the steam is shut off—which may have a tendency to draw off the water of condensation, it will be prevented from so doing by the action of the discharge from the radiator-line 29 keeping said chamber 10 supplied.

The action of the grease can readily be seen through the sight-glasses 19, arranged at each side of the member 9. These glasses are flat, of a suitable thickness for convenience and cheapness, are cut square in order to fit into the pockets 19′, formed at each side of the member 9, and are held in position by the hollow jam-nuts 20. The drain 30 affords a means of drawing off the contents of the cup when necessary.

The idea of having a heating-pipe connected directly with the supply-pipe and passing through the upper portion of the reservoir, which is illustrated and described but not broadly claimed herein, is made the subject-matter of generic claims in another application for reissue of Letters Patent filed herewith, Serial No. 492,608.

Having thus fully shown and described the construction and workings of my invention, what I claim as new, and desire to secure by Letters Patent, is—

1. In a grease lubricating device of the character described, a reservoir, a removable head attached to the reservoir and having a chamber formed in the central portion thereof, a condensing-tube adapted to communicate with the steam-line and entering said chamber and passing down through the reservoir nearly to the bottom of the same, means for regulating the amount of steam passing through this tube, a sight-feed line communicating with the reservoir and with the steam-line leading to the engine, and a heating-pipe leading from the steam-line through the reservoir into the sight-feed line, as and for the purpose set forth.

2. In a grease lubricating device of the character described, a reservoir, a removable head attached to the reservoir and having a chamber formed in the central portion thereof, a condensing-tube adapted to communicate with the steam-line and entering said chamber and passing down through the reservoir nearly to the bottom of the same, means for regulating the amount of steam passing through this tube, a hollow member including a collecting-chamber adapted to communicate with the steam-line, a passage leading from the reservoir and a port connecting the passage and the collecting-chamber, a nipple seated in the port, and a heating-pipe passing through the reservoir into the collecting-chamber.

3. In a grease lubricating device of the character described, a reservoir, a removable head attached to the reservoir and having a chamber formed in the central portion thereof, a condensing-tube adapted to communicate with the steam-line and entering said chamber and passing down through the reservoir nearly to the bottom thereof, means for regulating the amount of steam passing through this tube, a hollow member including a collecting-chamber adapted to communicate with the steam-line, a passage leading from the reservoir and a port connecting the passage and the collecting-chamber, a nipple seated in the port, a heating-tube passing through the chamber formed in the central portion of the head and extending down to a point adjacent to the bottom of the reservoir, a valve-regulated pipe connecting the steam-line with one end of the heating-tube and a coupling-tube leading to the sight-feed line connected with the other end thereof, a nipple communicating with said coupling-tube and extending into the collecting-chamber opposite the steam-line, and means for filling the reservoir through the head portion, as and for the purpose set forth.

4. In a grease lubricating device of the character described, the combination with a reservoir, of a head portion connected therewith and condensing means adapted to communicate with the steam-line and extending through the head and reservoir portions to a point adjacent to the bottom of the latter, of a heating-tube passing through the chamber formed in the central portion of the head and extending down nearly to the bottom of the reservoir, a valve-regulated pipe connecting the steam-line with one end of the heating-tube and a coupling-tube leading to the sight-feed line connected with the other end thereof, and a nipple communicating with said coupling-tube and extending into the collecting-chamber opposite the steam-line, as and for the purpose set forth.

5. In a lubricator, the combination with a reservoir, of a tubular extension thereon and communicating therewith, means for conducting a heating medium thereto, a heating-pipe extending through and discharging beyond the reservoir from the extension, a feed-line, the discharge end of said heating-pipe being adapted to communicate with the reservoir through the feed-line, and a valved condenser-pipe opening into the reservoir.

6. In a lubricator, the combination with a reservoir; of an extension thereon having a passage communicating with the reservoir, said passage having an enlarged portion; means for conducting a heating medium to the passage; a heating-pipe extending through the reservoir from the extension, the enlarged portion of the passage forming a chamber around said pipe; a feed-line constituting a means of communication between the heating-pipe and the reservoir; and a valved condenser-pipe opening into the reservoir.

7. In a lubricator, the combination with a reservoir; of an extension thereon and having a passage of varying size therein, valved means for conducting a heating medium to the passage, a heating-pipe extending from the passage through the reservoir, the largest portion of the passage forming a chamber around the heating-pipe; a feed-line constituting a means of communication between the heating-pipe and the reservoir; and a valved condenser-pipe opening into the reservoir.

8. In a lubricator, the combination with a reservoir and an adjacent feed-pipe connecting with the steam-line, of a feed-chamber leading from the reservoir to said feed-pipe, a condenser-pipe opening into the reservoir, a heating-pipe extending through and discharging beyond the reservoir and arranged to discharge into the feed-chamber directly opposite the opening of said feed-pipe, and means within said pipes for controlling the passage of steam therethrough.

9. In a lubricator, the combination with a reservoir and an adjacent feed-pipe connecting with the steam-line, of a feed-chamber leading from the reservoir to said feed-pipe, a condenser-pipe opening into the reservoir, a heating-pipe extending through and discharging beyond the cavity of the reservoir and arranged to discharge into the feed-chamber directly opposite the opening of said feed-pipe, and means within said pipes for controlling the passage of steam therethrough.

10. In a lubricator, the combination with a reservoir and an adjacent feed-pipe connecting with the steam-line, of a feed-chamber leading from the reservoir and opening into said feed-pipe, a heating-pipe extending through and discharging beyond the reservoir and arranged to discharge into the feed-chamber directly opposite the opening of said feed-pipe, and means within said heating-pipe for controlling the passage of steam therethrough.

11. In a lubricator, the combination with a reservoir and an adjacent feed-pipe connecting with the steam-line, of a feed-chamber leading from the reservoir and opening into said feed-pipe, a heating-pipe extending through and discharging beyond the cavity of the reservoir and arranged to discharge into the feed-chamber directly opposite the opening of said feed-pipe, and means within said heating-pipe for controlling the passage of steam therethrough.

12. In a lubricator, the combination with a reservoir and an adjacent feed-pipe connecting with the steam-line, of a feed-chamber leading from the reservoir and opening into said feed-pipe, and a heating-pipe extending through and discharging beyond the reservoir and arranged to discharge into the feed-chamber directly opposite the opening of said feed-pipe.

13. In a lubricator, the combination with a reservoir and an adjacent feed-pipe connecting with the steam-line, of a feed-chamber leading from the reservoir and opening into said feed-pipe and a heating-pipe extending through and discharging beyond the cavity of the reservoir and arranged to discharge into the feed-chamber directly opposite the opening of said feed-pipe.

14. In combination, a steam-line, a lubricator including a reservoir, a collecting-chamber, and a feed pipe leading from one side of the collecting-chamber to the steam-line, there being continuous communication between the reservoir through the collecting-chamber and the steam-line, and a pipe connecting directly with the steam-line above said feed pipe and arranged to discharge live steam into the other side of the collecting-chamber and directly across the cavity of the same into said feed pipe, whereby the drops of lubricant are squarely impinged by the steam discharge and driven directly into said feed pipe.

FRANK LOWRY.

Witnesses:
Wm. R. Rhoads,
Ruth A. Miller.

Copies of this patent may be obtained for five cents each, by addressing the "Commissioner of Patents, Washington, D. C."